Figure 3:
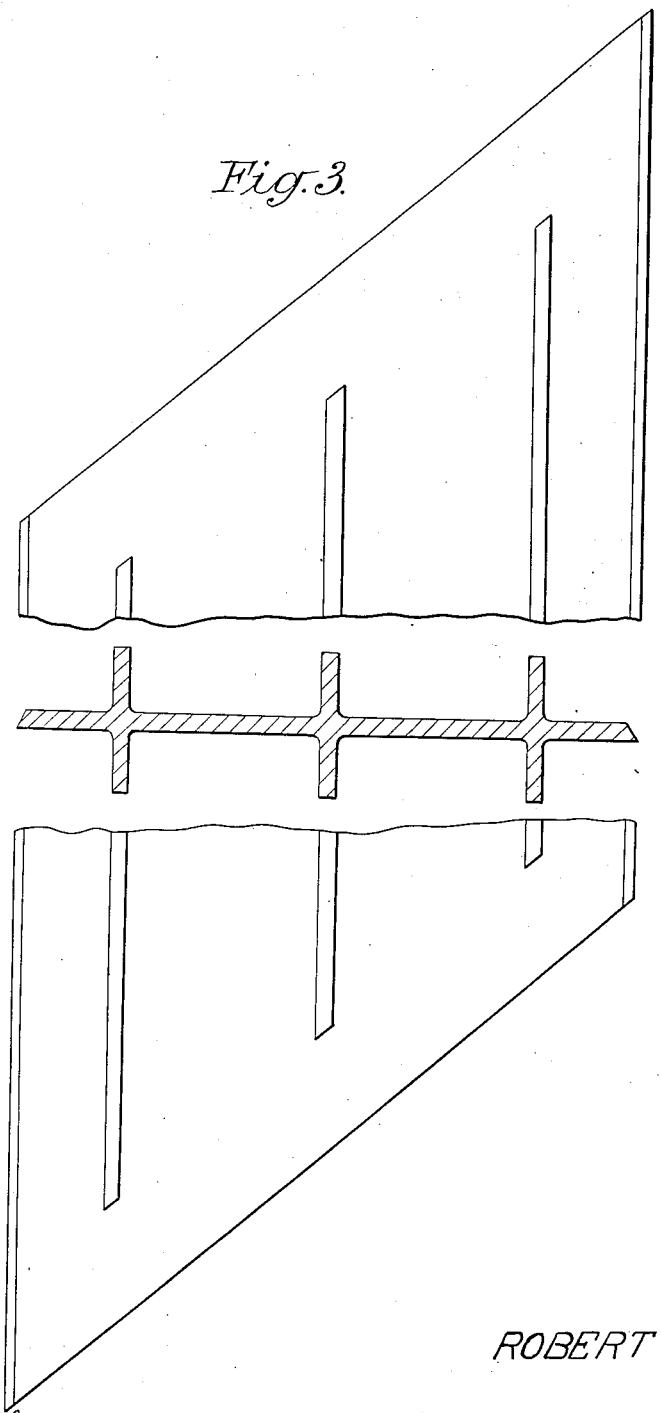

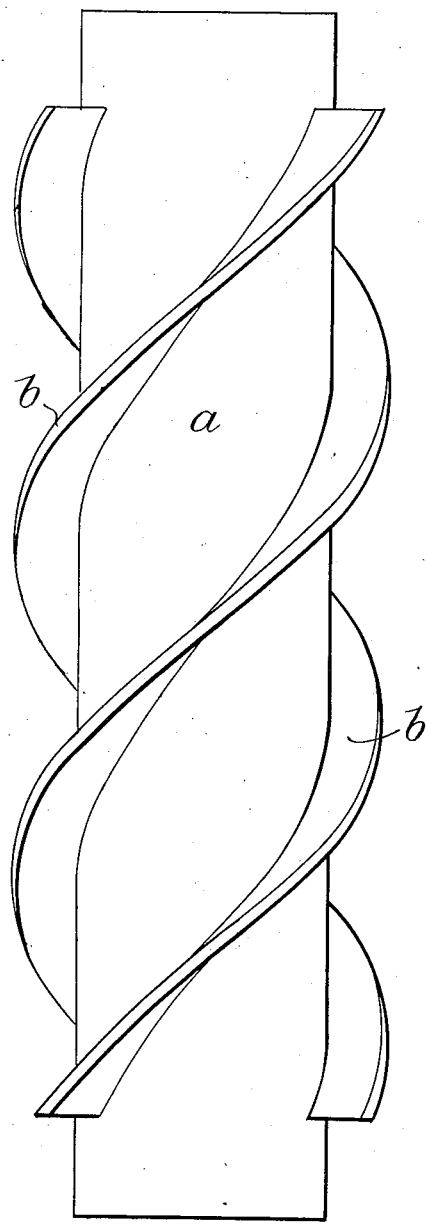
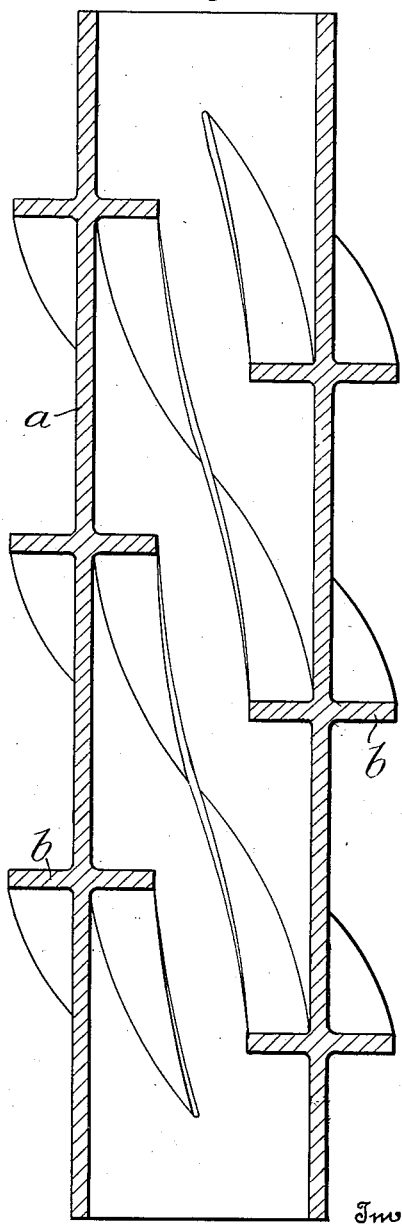

Inventor
ROBERT ALLEN

UNITED STATES PATENT OFFICE.

ROBERT ALLEN, OF CAVERSHAM, ENGLAND.

METHOD OF MANUFACTURING METAL TUBES.

1,324,714.          Specification of Letters Patent.      Patented Dec. 9, 1919.

Application filed July 2, 1913. Serial No. 777,049.

*To all whom it may concern:*

Be it known that I, ROBERT ALLEN, subject of the King of Great Britain and Ireland, residing at "Lynwood," Kidmore Road, Caversham, Oxfordshire, England, have invented certain new and useful Improvements in Methods of Manufacturing Metal Tubes, of which the following is a specification.

This invention relates to a method of manufacturing metal tubes for heaters, superheaters and other surface apparatus, and has special reference to tubes provided with helical internal and external ribs.

The object of the invention is to provide an improved and inexpensive method of manufacturing tubes of the above mentioned character, and one by which the tubes will be strong and durable and capable of being used effectively for the purpose for which they are designed.

In one method of constructing the tubes with internal and external spiral ribs according to this invention, each tube is formed by winding one or more cross irons or T irons helically around a suitable mandrel and welding the windings together, or a series of pairs of opposed ribs may be formed on a plate sufficiently wide to form the tube with a single winding.

In another method of constructing the tubes, spiral ribs projecting both inside and outside the tubes are welded to the tubes, each tube being preferably provided with three or more spiral ribs of rapid pitch. The tubes with triple ribs are formed by winding three flat metal strips helically on a suitable mandrel leaving three helical spaces into which the ribs formed of flat strips curved edgewise are inserted so as to project both inside and outside the tube, the helical ribs being then secured, and the joints closed by electric welding or other means.

The invention is hereinafter described with reference to the accompanying drawings in which, Figures 1 and 2 are elevation and longitudinal section respectively of a tube with spiral ribs, and Fig. 3 illustrates in plan and transverse section a ribbed plate from which the tube is formed.

Figs. 1 and 2 show the complete tubes *a* formed with the internal and external ribs *b*. These tubes are made in various ways, and I will proceed to describe one convenient method with reference to Fig. 3. A solid plate is taken and machined or rolled to the shape shown, that is, longitudinal integral ribs are produced by rolling or by cutting away portions on opposite sides of the plate, these ribs terminating at a short distance from the ends of the plate which are cut at an angle. The plate is then heated and forced around a helically grooved mandrel to form the tube shown in Figs. 1 and 2, the joint being autogenously welded.

By inserting rods in the centers of the tubes to close the passage between the ribs the whole of the gases can be compelled to flow in a helical course through the tubes.

What I claim and desire to secure by Letters Patent is:—

1. A method of manufacture of metal tubing with helical internal and external integral ribs, consisting in first forming the ribs on a metal blank, then winding the blank helically around a mandrel, and finally welding the whole together into tube form.

2. A method of manufacture of metal tubes having opposed internal and external helical ribs integral therewith, consisting in forming ribs on opposite faces of a straight metal blank, winding the ribbed blank helically around a mandrel, and joining the whole of the convolutions together to form a continuous length of tubing.

3. A method of manufacturing a metal tube with a helical internal passage and external helical ribs consisting in winding a metal strip with opposed ribs around a mandrel, withdrawing the mandrel and inserting filling means in the central portion of the tube unoccupied by the ribs.

4. The method of manufacturing a tube having helical passages therein, consisting in providing a strip with parallel ribs extending along one of its sides, bending the strip helically so that said ribs extend inward and the longitudinal edges of the strip abut against one another, and sealing the joint formed by the meeting edges of said strip.

5. The method of manufacturing a tube having helical passages therein, consisting in providing a strip with parallel ribs extending along one of its sides, bending the strip helically so that said ribs extend inward and the longitudinal edges of the strip abut against one another, sealing the joint formed by the meeting edges of said strip, and securing a cylindrical core to the inner edges of the ribs in a manner to separate the passages from one another and from the space encompassed by said ribs.

6. The method of forming a tube with a helical rib, consisting in forming a strip with a rib projecting from one of its sides and extending longitudinally thereof, winding the strip helically and thereby causing its longitudinal edges to meet one another, and sealing the joint at the meeting edges.

In testimony whereof I have affixed my signature, in presence of two witnesses.

ROBERT ALLEN.

Witnesses:
BENJ. TULL,
JOHN UTLEY.